(12) United States Patent
Srinivasa et al.

(10) Patent No.: US 6,618,046 B1
(45) Date of Patent: Sep. 9, 2003

(54) SYSTEM AND METHOD FOR ESTIMATING THE RENDERING COST FOR IMAGES

(75) Inventors: Ganapati N. Srinivasa, Portland, OR (US); Gopalan Ramanujam, Hillsboro, OR (US); Glenn M. Lewis, Newport Beach, CA (US); Calvin J. Lin, Hillsboro, OR (US); Jeffrey A. Larson, Beaverton, OR (US); Arunachalam S. Prakash, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/675,610

(22) Filed: Sep. 29, 2000

(51) Int. Cl.⁷ .............................................. G06T 17/00
(52) U.S. Cl. ........................................ 345/418; 705/400
(58) Field of Search ................................. 345/418, 419, 345/423, 427; 705/400

(56) References Cited

U.S. PATENT DOCUMENTS 6,064,393 A * 5/2000 Lengyel et al. ............. 345/427
6,072,479 A * 6/2000 Ogawa ....................... 345/302
6,229,546 B1 * 5/2001 Lancaster et al. ........... 345/419
6,278,464 B1 * 8/2001 Kohavi et al. ............... 345/440
6,304,263 B1 * 10/2001 Chiabrera et al. ........... 345/419
6,456,286 B1 * 9/2002 Arai et al. ................... 345/423

* cited by examiner

Primary Examiner—Mano Padmanabhan
Assistant Examiner—Hue Dung X. Cao
(74) Attorney, Agent, or Firm—Blakely, Sokoloff, Taylor & Zafman LLP

(57) ABSTRACT

A rendering cost estimation method is provided for generating a rendering cost estimate that that is sufficiently close to an actual rendering cost that would be incurred if computer-generated images were actually rendered from a computer-graphics model. A plurality of cost factors that affect the actual rendering cost are identified. Representative information, including rendering cost estimation parameters that adequately characterize the cost factors, is derived from the computer-graphics model. The estimation parameters are combined with rendering cost estimation relationships that express the affect of the cost factors on the rendering cost. A rendering cost estimate is generated based on the estimation parameters derived from the computer-graphics model and the estimation relationships.

24 Claims, 6 Drawing Sheets

|  | AA Low | AA Medium | AA High | AA Highest |
|---|---|---|---|---|
| MB off | 0 | 1 | 3 | 6 |
| MB 2D | 1 | 2 | 4 | 7 |
| MB 3D | 1 | 2 | 4 | 12 |

SYSTEM AND METHOD FOR ESTIMATING THE RENDERING COST FOR IMAGES

BACKGROUND OF THE INVENTION

1. Field of the Invention

The invention relates generally to rendering computer-generated images. More particularly, the invention relates to a system and method for generating a rendering cost estimate that is sufficiently close to an actual rendering cost that would be incurred if the computer-generated images were actually rendered.

2. Background Information

Computer technology has recently found many practical applications in multimedia such as major Hollywood feature productions, television programs, commercials, video games and other media. Computer-generated images to provide photo-realistic imagery, animation, and special effects are increasingly used to provide new content and to make entertainment more immersing and entertaining. For example, computer-generated images have been used by motion picture and television studios to create realistic visual effects such as the dinosaurs in Jurassic Park, the animals in Jumanji, special effects for Titanic (the highest-grossing movie of all time), and all of Toy Story (the first fully computer-generated cinematic animation).

One of the final and most computationally demanding steps of providing computer-generated images is rendering. Rendering involves conversion of a digital model, containing 3D data, textures, colors, lighting, antialiasing, motion blur, and other effects, into a sequence of images. Rendering a single image can take just a few seconds, a few minutes, or hours, depending upon the detail specified in the digital model and the computer system performing the rendering. This may become considerable when a one-minute movie sequence may consist of 1800 images or frames.

Rendering computer-generated images can monopolize the processing resources of small studios for days or months at a time. Outsourcing the rendering is a viable alternative. One way to do this is to purchase processing time from a service provider that operates a server farm, where several hundred powerful processors may be harnessed together to convert the data into rendered images.

In these and other environments, it is desirable to know the resources such as processing time, needed to render the computer-generated images, before the images are rendered. Advantageously, this may make it possible for film studios and others to integrate rendering schedules and costs with production schedules, timelines, and budgets.

BRIEF DESCRIPTION OF THE SEVERAL VIEWS OF THE DRAWINGS

The novel features of the invention are set forth in the appended claims. The present invention is illustrated by way of example, and not by way of limitation, in the figures of the accompanying drawings in which like reference numerals refer to similar elements. The invention itself, however, as well as a preferred mode of use, will best be understood by reference to the following detailed description of an illustrative embodiment when read in conjunction with the accompanying drawings:

DETAILED DESCRIPTION OF THE INVENTION

Figure 1:
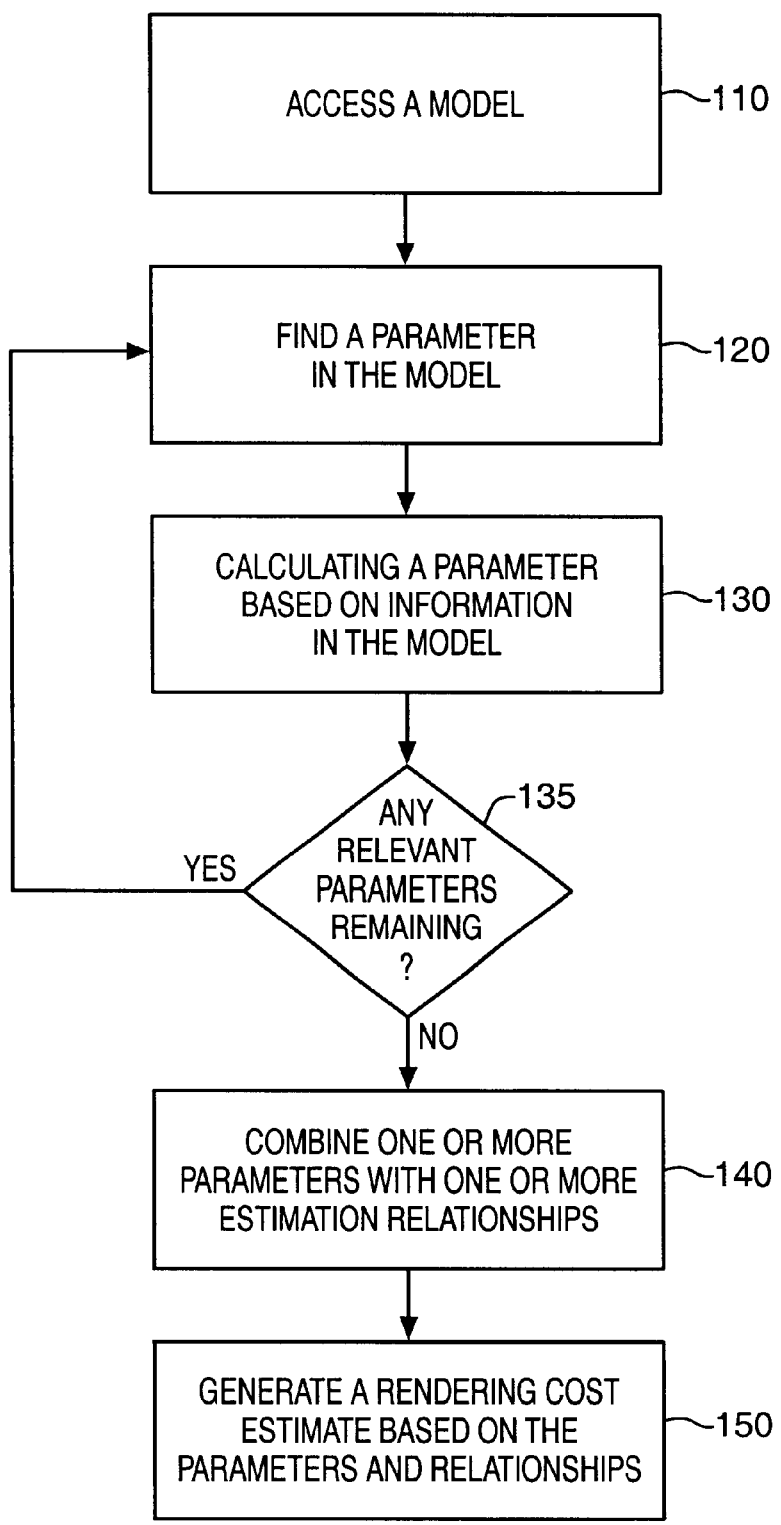
FIG. 1 is a flow diagram that shows generating a rendering cost estimate according to one embodiment of the present invention.

A system and method are described for generating a rendering cost estimate that is sufficiently close to an actual rendering cost that would be incurred, should the actual rendering job be performed. The rendering cost estimate is a value that approximates an actual cost or expenditure of resources (e.g., time, price, computer processing time) to render one or more images.

Broadly stated, embodiments of the invention comprise providing representative information derived from a computer-graphics model to be rendered, such as a 3D model, to a rendering cost estimator and generating a rendering cost estimate based on the representative information. The computer-graphics model may be any computer-readable medium, such as a computer file, or a datastructure, that may be used in rendering, such as to provide graphics content or representative information. The representative information may be derived from the computer-graphics model by being present in the computer-graphics model, being calculated or otherwise determined based on other information in the computer-graphics model, or may be user-supplied information taken in connection with the computer-graphics model. In one embodiment, the representative information includes rendering cost estimation parameters that represent cost factors that are associated with graphics content or affect rendering calculations. According to one embodiment, the rendering cost estimate is based on using relationships, such as heuristic, empirical, statistical, algorithmic, logical, semi-theoretical, and theoretical relationships to express a plurality of rendering cost estimation parameters and generate a rendering cost estimate that is sufficiently close to an actual rendering cost that would be incurred, should the rendering job actually be completed.

Typically, the representative information includes as little information or as few estimation parameters as possible to sufficiently characterize the cost factors that are included in the rendering cost estimation method. In one embodiment, the number of cost factors and rendering cost estimation parameters included in the method balance the need to obtain an accurate estimate with the need to avoid making development of the method burdensome. In one embodiment, a cost for generating the rendering cost estimate should be substantially less than the actual rendering cost. For example, it would be desirable if the estimating cost were between approximately 1/100th to 1/100,000th of the actual rendering cost.

Accordingly, a system and method are provided for generating a sufficiently accurate and precise rendering cost estimate based on representative information derived from a computer-graphics model. Advantageously, practitioners in the film, advertising, HDTV, video game, virtual reality, computer-aided design (CAD), and other industries may use the system and method to obtain estimates that may enhance compliance with budgeting and scheduling. For example, the rendering cost estimate according to certain embodiments may provide film studios an accurate estimate for the rendering cost before the rendering is done. Advantageously, this may make it possible for the studios to integrate rendering objectives with production schedules, timelines, and budgets. These advantages may assist in alleviating the costly overrun of time schedules and budgets.

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Rendering in General

Rendering is the process of creating images or scenes from a computer-graphics model, such as a 3D model. Rendering can be photorealistic in which realism is the desired outcome and non-photorealistic (e.g., animation, cartoon shading, and painterly rendering).

A 3D model is one type of computer-graphics model that may be generated by a number of graphics software packages. The 3D model typically includes data that describes graphics content, such as one or more objects, surface characteristics of the objects, backgrounds for the objects, environmental lighting, and a virtual camera location. The objects and the virtual camera may be given a path of motion over a specified time. The objects are typically represented by a set of descriptive points that establish a position and dimensions for the object. For example, six points in a 3D space may represent a cube. The computer-graphics model may also include data that describes rendering preferences, such as settings for antialiasing or motion blur.

A number of graphic software packages are available to create the 3D models, including among others, Maya™ available from Alias/Wavefront of Toronto, Canada; RenderMan® available from Pixar of Point Richmond, Calif.; Softimage® available from Avid Technology of Tewksbury, Mass.; Mental Ray® available from mental images GmbH & Co. KG of Berlin, Germany; and Adobe Photoshop® available from Adobe Systems Inc. of San Jose, Calif. The computer-graphics package may affect the rendering cost and may affect how other cost factors affect the rendering cost. For example, different graphics packages may use different algorithms, have different calculation efficiencies (e.g., some packages may require more instructions to perform the same operation), and provide different rendering options. Graphics packages may also have different capabilities and efficiencies for rendering in a parallel processing environment. For example, Maya is multi-threaded and parallel in nature, while RenderMan is single-threaded and has no built in parallelism. Accordingly, parameters that may represent these factors include parameters that describe how parallelism is supported, parameters that describe rendering algorithms (e.g., antialiasing algorithms), and other parameters.

When relatively accurate estimates are desired, at least slightly different rendering cost estimation methods will be used for most or all graphics packages to account for differences between the graphics packages. Accordingly, in certain embodiments different rendering cost estimation methods or portions of those methods may be used for certain graphics packages, due to factors like support for parallelism, different algorithms, novel features, and other factors. Also, 3D model developers may use multiple graphics packages in order to develop a 3D model with all the desired features. Accordingly, In one embodiment, the rendering cost estimation method will be able to generate a rendering cost estimate for a 3D model created with multiple graphics packages. In one embodiment, at least some of the relationships to express the graphics package factors will be different. For example, relationships may be added, modified by modifiers or modifying relationships, or other ways to account for the differences and make the rendering cost estimate relevant for a given graphics package. In one embodiment, actual rendering data for the given graphics package will be used to account for differences between graphics packages. Advantageously, accounting for differences between graphics packages may provide more accurate and precise rendering cost estimates, although the methods may be more difficult to develop.

In other embodiments, where relatively less accuracy is desired, substantially the same relationships may be used for multiple graphics packages. According to one embodiment, due to the many graphics packages available, a rendering cost estimate may be generated by incorrectly assuming that the 3D model was developed using a given graphics package. Advantageously, this may be desirable when necessity, or commercial considerations outweigh accuracy considerations.

In addition to graphics content, such as objects in a 3D model, rendering is also typically performed based on a number of rendering preferences, which typically affect rendering calculations and the visual appearance of the rendered images. Exemplary rendering preferences include antialiasing, ray tracing, and motion blur. These rendering preferences will typically be defined in the 3D model. Typically, one or more of the rendering preferences will be included in the rendering cost estimate.

Images may be rendered into any desired machine-readable format, rendered onto film or videotape, or displayed directly on a display or TV screen (such as in an HDTV virtual set). In one embodiment, the machine-readable format will be compatible with Windows, X-Windows, NT, Macintosh, Linux, Unix, SGI, Sun Solaris, or other operating systems. Exemplary formats include PICT and PIC (for Macintosh), Targa, TIFF, BMP, JPEG, 24-bit quantized, floating-point RGB, PostScript, CAD formats (e.g., DXF and IGES), and others. Images may also be converted between machine-readable formats.

Generating a Rendering Cost Estimate

FIG. 1 shows a flow diagram for generating a rendering cost estimate according to one embodiment of the present invention. At block 110 a computer-graphics model, such as a 3D model is accessed. The computer-graphics model may be accessed from a local memory or mass storage device (e.g., an optical disk), or accessed from a remote computer system via a data transmission medium in a computer network (e.g., an intranet or the Internet).

At block 120 zero or more rendering cost estimation parameters, are determined by finding the parameters in the computer-graphics model. Typically values, such as a resolution value are determined for the parameters. For example, an antialiasing parameter may be found by finding antialiasing information in the 3D model and finding a parameter that represents the antialiasing setting.

At block 130 zero or more rendering cost estimation parameters are determined by calculating the parameters based on information in the computer-graphics model. Typically parameter values will be calculated. For example, determining the number of triangles may include calculating the number of triangles based on triangle information (e.g., x,y,z coordinates of the vertices) in the 3D model.

Typically many different parameters are used to generate the estimate. In one embodiment, a list of the parameters to be used is generated for each estimate. Parameters may be found, calculated, or both. Accordingly, a parameter may be found according to block 120, calculated according to block 130, or both. After a parameter is found or calculated, a comparison is made to the list, block 135, to determine whether there are any more parameters to find or calculate. If so, the next parameter is found, block 120, or calculated, block 130, as discussed above. If not, the process goes to block 140.

At block 140 one or more parameters are combined with one or more rendering cost estimation relationships. Typically, separate relationships will be used to express the effect of one cost factor or a combination of cost factors on the rendering cost. For example, a first relationship may be used to represent the effect of antialiasing and motion blur and a second different relationship may be used to express the effect of ray tracing. Parameter values representing antialiasing and motion blur may be combined with the first relationship and parameter values representing ray tracing may be combined with the second relationship. Since some parameters may represent multiple cost factors, some parameters may be combined with multiple relationships.

At block 150 a rendering cost estimate is generated based on the rendering cost estimation parameters and the estimation relationships. In one embodiment, the one or more relationships are evaluated based on the corresponding parameter values and these relationships are combined to generate the rendering cost estimate. Other ways of generating a rendering cost estimate may depend on the particular relationships.

Determining Representative Information

Representative information from the computer-graphics model is used to generate the rendering cost estimate. The representative information may include information that is actually in the computer-graphics model (e.g., a setting for antialiasing), information that is not in the computer-graphics model (e.g., the number of triangles which may be calculated), information that may be supplied by a user (e.g., a completion time for the rendering or a price to pay), and other information. Typically, the representative information is associated with graphical content (e.g., number of triangles) or a rendering preference (e.g., resolution).

The representative information may be associated with one or more cost factors. Cost factors and their corresponding representative information may be used individually or in combination. The latter may be advantageous when the factors affect one another, when the combination is easier to represent, or for other reasons. In one embodiment, cost factors that have a significant impact on the rendering cost, that affect most 3D models, or that are supported by multiple graphics packages may be included. Exemplary cost factors that are typically included are resolution (of the rendered images), number of triangles, antialiasing, motion blur, ray tracing, and number of lights. These exemplary cost factors will be discussed further below.

Resolution refers to the amount of information that may be expressed by an image, such as the number of distinct points or pixels that may be displayed. For example, the resolution of a pixel display may be 320×240, 1024×1024, or 4096×4096.

Primitives are graphics elements used to build 3D models and/or images. Exemplary primitives include points, lines, triangles, arcs, cones or spheres. Triangles are one of the more commonly used primitives.

Antialiasing is the application of techniques that reduce or eliminate jaggies or staircasing that may arise when resolution is not sufficient to represent a smooth line.

Jaggies may result in the all-or-nothing approach of assigning/not assigning a primitives color to a pixel. Different algorithms are also available for antialiasing.

One approach for reducing antialiasing is to use varying color intensities intermediate between the line and the background around the jaggies. Many algorithms allow varying levels of antialiasing correction (e.g., low, medium, high, and highest).

Motion blur is a cost factor that simulates a camera shutter remaining open for an extended period of time, and the corresponding appearance of object motion that has occurred over this period of time. That is, motion blur captures the motion occurring between frames. In computer-generated images, such as animation, motion blur more accurately incorporates the visual effect of motion. Different approaches for achieving motion blur are possible. One approach uses supersampling, which involves taking a higher density of samples in the time dimension than needed for the final frame rate of the image sequence. Another approach involves using a pointspread function to convolve each frequency domain image. Another approach is distributing rays in time. The result may be a blurred spatial domain image.

Ray tracing is a cost factor typically used to provide photorealism by providing variations in shade, color intensity, and shadows by having one or more light sources.

Typically, ray tracing simulates the path of a light ray as it is reflected and absorbed by objects in the image. Typically, ray tracing involves creating a light source with properties such as intensity and color, followed by specifying how reflective or absorbent the objects in the image are. Depending on how many lights are used, how much of a scene is ray traced, and how many object-object reflective interactions are present, ray tracing may be one of the more computationally demanding cost factors.

Lights, such as zero, one, or more lights, may be provided in the 3D model to illuminate objects in the model. Lights may have different colors, intensities, directions and other properties. Objects may also be given reflective or absorptive properties for a light or lights.

Many additional cost factors may affect the rendering cost. A partial list of exemplary cost factors includes: physically-based modeling, constraint-based modeling, fractals, analytical anti-aliasing, vector-based motion blur, motion-blurred shadows, multi-threaded ray-tracer, patches, patch meshes (bi-cubic, Bezier, NURBS), particle systems, depth cue, fog and snow foregrounds, advanced atmospheric effects, shading (e.g., flat, Gouraud and Phong), ray cast shadows, soft shadows, shadows cast by semi-transparent objects, caustics, transparent surfaces, multiple reflectance shaders (matte, metallic), incremental scene changes, space warps, depth of field, wireframe rendering, adaptive tessellation of surface geometry, fast hidden-line rendering, inter-penetrating geometry (D-zero meshing), chrome-like reflections, glass and mirror reflectance, erosion, multi-threaded faceting, environment mapping (e.g., reflection mapping), and other cost factors. These parameters and many others are well known to those skilled in the art. Other cost factors may be specific to a certain graphics software package and are well known to those skilled in the use of those gaphics software packages.

Determining Rendering Cost Estimation Parameters

In one embodiment, the representative information may include one or more rendering cost estimation parameters. The parameters may be used to represent cost factors, such as those discussed above. In one embodiment, and to simplify the rendering cost estimation method, substantially the fewest number of parameters that are able to sufficiently characterize the cost factor are determined. Typically, the rendering cost estimation parameters are derived from the computer-graphics model (e.g., a 3D model) by determining them from the computer-graphics model by finding them in the model, or calculating the parameters based on information in the computer-graphics model. For example, for the cost factor number of triangles, the actual number of triangles may be a parameter that is determined from the 3D model by counting the number of triangles in the 3D model. Parameters may not be associated with the computer-graphics model, such as if a user provides a time to complete the rendering, a price for the rendering, or other information.

Typically, the representative information will include one or more parameters describing the cost factors discussed above. The cost factors may increase the rendering cost estimate, or decrease the rendering cost estimate (e.g., if information in one rendered image may be reused without re-rendering in another image). In one embodiment, parameters for one or more of the following cost factors, resolution, number of triangles, antialiasing, motion blur, ray tracing, and number of lights, will be included in the representative information. Exemplary parameters that may be used to represent these factors will be discussed further below.

Resolution may be represented by parameters that describe total number of pixels, codes (e.g., codes for VGA, SVGA, etc.), and other parameters.

The number of primitives may be represented by parameters such as the actual number of primitives (e.g., the number of triangles), parameters describing antialiasing, resolution, and other parameters.

Antialiasing may be represented by parameters such as parameters that describe the algorithm used for antialiasing, the antialiasing setting (e.g., low, medium, high, or very high), resolution, the number of primitives, and other parameters.

Motion blur may be represented by parameters such as parameters that describe the approach or algorithm used for motion blur, the motion blur setting (e.g., motion blur off, 2D motion blur or 3D motion blur), antialiasing parameters, resolution parameters, how many objects are moving, and others.

Ray tracing may be represented by parameters such as parameters that describe the algorithm used, the number of lights, reflection and absorption properties, how much of the image is affected by ray tracing (e.g., percent of image that is ray traced), how many object-object reflective interactions are present, resolution, and other parameters.

The number of lights may be represented by parameters such as parameters that describe characteristics of the lights (e.g., color, position, intensity, direction, light-decay), parameters that describe ray tracing, and other cost factors.

Combining the Representative Information With Estimation Relationships

Representative information, such as the rendering cost estimation parameters, may be combined with rendering cost estimation relationships. One or more or any combination of heuristic, empirical, statistical, algorithmic, logical, semi-theoretical, theoretical, and other relationships may be used. The relationships may also be specific to any combination of software and hardware.

The choice of relationships and representative information, such as parameters, will depend on the desired level of accuracy in the rendering cost estimate. When relatively accurate estimates are desired, typically more relationships and better-developed relationships will be used. There may be more relationships because more cost factors may be included in the estimation method. Also, more sophisticated relationships, such as quadratic rather than linear relationships, and more actual rendering data may be used to develop the relationships. Also, when relatively accurate estimates are desired, more representative information is included. For example, more rendering cost estimation parameters may be included, since they may be better able to represent the corresponding cost factors.

Heuristic, empirical and statistical relationships are based more on observation than on theory. In one embodiment, an empirical relationship may include using actual rendering data to generate a multiplier for a particular cost factor to scale a rendering cost that otherwise ignores the particular cost factor. For example, see the first exemplary rendering cost estimation method discussed below. Alternatively, statistical equations and the parameters may be used to generate a rendering cost estimate. These relationships can simplify the estimation calculation.

Algorithmic and logical relationships may also be used. In one embodiment, logical conditions are provided to allow different relationships to represent cost factors. For example, based on a logical determination that splines, rather than polygons, are used in the 3D model, a spline-based relationship may be used in the rendering cost estimation method. Advantageously, this may allow more robust rendering cost estimation methods to be developed, by allowing the method to assume varying levels of complexity and accuracy.

Semi-theoretical methods may be based on both theory and observation. An exemplary semi-theoretical method may include generating an antialiasing cost contribution based on the total perimeter that antialiasing is applied to, and generating a texture cost contribution based on the area the textures is applied to. For example, the antialiasing cost contribution may be generated by multiplying the perimeter by a statistically or non-statistically determined antialiasing coefficient, such as antialiasing cost contribution per unit perimeter. Theoretical relationships are also possible, where both the form of the expression and the coefficients are suggested by theory.

As discussed above, the representative information may include rendering cost estimation parameters for cost factors such as resolution, number of triangles, antialiasing, motion blur, ray tracing, and number of lights. Exemplary relationships for these cost factors will be discussed below.

The rendering cost typically increases with increasing resolution. In one embodiment, substantially linear relationships may suffice. This may be most true when the same calculations are repeated for each additional pixel. For example, when considering the rendering of an object using ray tracing, motion blur and other calculations, if twice as many pixels are used to represent that object (resolution twice as high) then twice as many calculations will typically need to be done. In other embodiments, the relationship may not be substantially linear, such as when the added pixels are filled in by interpolated values, rather than repeating the rigorous calculations, or when resolution is combined with other factors that cause the relationship to be nonlinear.

The rendering cost typically increases as the number of primitives, such as triangles, increases. In one embodiment, a substantially linear relationship may suffice. This approximation may be better satisfied when the primitives have similar characteristics (e.g., all of the same type, same size, same antialiasing criteria, same textures, and others). In other embodiments, the relationship may not be substantially linear, such as when the characteristics are not similar, or when the factor is combined with other factors that cause the relationship to be nonlinear.

The rendering cost typically increases with increasing antialiasing and antialiasing methods of increasing complexity. Typically, the relationship will be sufficiently nonlinear, although a linear relationship may be used as an approximation. The effect of antialiasing will also typically increase with motion blur, resolution, and the number of primitives, because more pixels may be affected by the antialiasing calculations. In one embodiment, antialiasing and motion blur may be combined in a relationship. Advantageously, this may take care of interactions between the factors that may depend upon the respective settings. In one embodiment, antialiasing may be scaled using a relationship and a perimeter cost (e.g., total line length affected by antialiasing). This latter approach will be discussed further in the second exemplary method for generating a rendering cost estimate discussed below.

The rendering cost typically increases with increasing motion blur and motion blur methods of increasing complexity. Typically, the relationship will be sufficiently nonlinear, although a linear relationship may be used as an approximation. The effect of motion blur will also typically increase as more objects are affected by the motion blur, the objects become more complex, and as antialiasing, resolution, and the number of primitives increases. In one embodiment, antialiasing and motion blur may be combined in a relationship. Advantageously, this may take care of interactions between the factors that may depend upon the respective settings. In one embodiment, motion blur may be scaled using a relationship and an area cost (e.g., an area of pixels affected by motion blur). This latter approach will be discussed further in the second exemplary method for generating a rendering cost estimate discussed below. Depending on the parameters, including the resolution, complexity of motion in the scene, motion blur may strongly affect the rendering cost.

The rendering cost typically increases with increasing ray tracing. Typically, the relationship will be sufficiently nonlinear, although a linear relationship may be used as an approximation. In one embodiment, the effect of ray tracing on the rendering cost will increase with an increasing number of lights. The effect may increase when the light fall-off or decay is set low. In one embodiment, the effect of ray tracing on cost will increase with increasing percent of the screen that is ray traced. In one embodiment, ray tracing may be scaled using a relationship and an area cost (e.g., an area of pixels affected by motion blur). This latter approach will be discussed further in the second exemplary method for generating a rendering cost estimate discussed below. In one embodiment, the effect on cost will increase when ray tracing is used with more complicated methods such as radiosity, where light is conserved (energy emitted or reflected by every surface is accounted for by its reflection from or absorption by other surfaces). Depending on the way ray tracing is used, it may have a larger affect on the rendering cost than many of the other cost factors. Average to above average use of ray tracing may increase the rendering cost by a multiplier between approximately 5–15.

The rendering cost typically increases with increasing number of lights. In one embodiment, a substantially linear relationship may suffice. This approximation may be better satisfied when the lights have similar characteristics (e.g., intensity, color, decay) and when the objects illuminated have similar characteristics. In one embodiment, the effect on cost of the number of lights may be incorporated with ray tracing or radiosity. In other embodiments, the relationship may not be substantially linear, such as when the characteristics are not similar, or when the factor is combined with other factors that cause the relationship to be nonlinear.

In certain embodiments, actual rendering data may be used to train the relationships. In one embodiment, actual rendering data is for rendering jobs of varying graphical content and rendering preferences. Advantageously, this may increase the accuracy of the relationships for producing estimates. For example, these relationships may be more robust at providing accurate rendering cost estimates when unusual parameter values are encountered. In another embodiment, when representing a given factor (e.g., antialiasing), it may be advantageous to use actual data where the given factor changes, but all other factors (e.g., ray tracing, motion blur) are at their typical values and are substantially constant. Advantageously, this may allow the effect of the factor or combination of factors on the rendering cost to be isolated, which may improve the accuracy of the method for producing estimates. Data from different graphics packages may be used separately, which will typically be done when relatively high accuracy is desired, or combined, which will typically require less effort to develop the relationships.

The training may be done by statistical or non-statistical techniques. In certain embodiments, statistical and regression-techniques may be used. Advantageously, this approach may provide relationships that best describe the actual data and may also have better capacity for producing estimates. Many statistical and regression methods assume that the factors are independent (do not affect one another), which may not be the case for certain parameters. Depending on the desired accuracy, specialized statistical approaches may be consulted.

In other embodiments, non-statistically determined relationships, such as graphically determined relationships, rules-of-thumb, or even guesses may be used. However, relationships developed by these techniques may have less accuracy than statistically-derived relationships.

In one embodiment, the relationships may be changed or improved over time. Actual rendering costs, rendering cost estimation parameters, and other data may be stored in a database, and continuously or periodically some or all of this data will be examined, statistically and otherwise, either automatically or manually, in order to improve the rendering cost estimation system and method. For example, certain statistically determined rendering cost estimation coefficients may be adjusted based upon actual rendering cost information which has been compiled since the coefficients were last determined. In another embodiment, the actual rendering cost data may be used to identify deficiencies in the system and method that require changes beyond retraining the relationships. For example, the data may indicate new versions of graphics packages with new features, unconventional rendering jobs (e.g., when 3D models are created with splines rather than polygons) and others.

Generating a Rendering Cost Estimate

The rendering cost estimate may be generated based on each image separately, combinations or sequences of images, the computer-graphics model, the 3D model or others. Typically, the rendering cost estimate will be based on each image treated separately. For example, representative information (e.g., estimation parameters) may be determined to represent characteristics, such as cost factors, for the image. Then the contributions of the separate images may be combined to generate the rendering cost estimate. Advantageously, this may allow the cost factors in each image to be reflected in the estimate. In one embodiment, a single rendering cost estimate may be generated for a sequence of images, such as by averaging parameter values for the sequence of images, generating a rendering cost estimate, and multiplying by the number of images. Other ways of generating the rendering cost estimate are contemplated and would be apparent equivalents to those skilled in the art.

First Exemplary Rendering Cost Estimation Method

Figure 2:
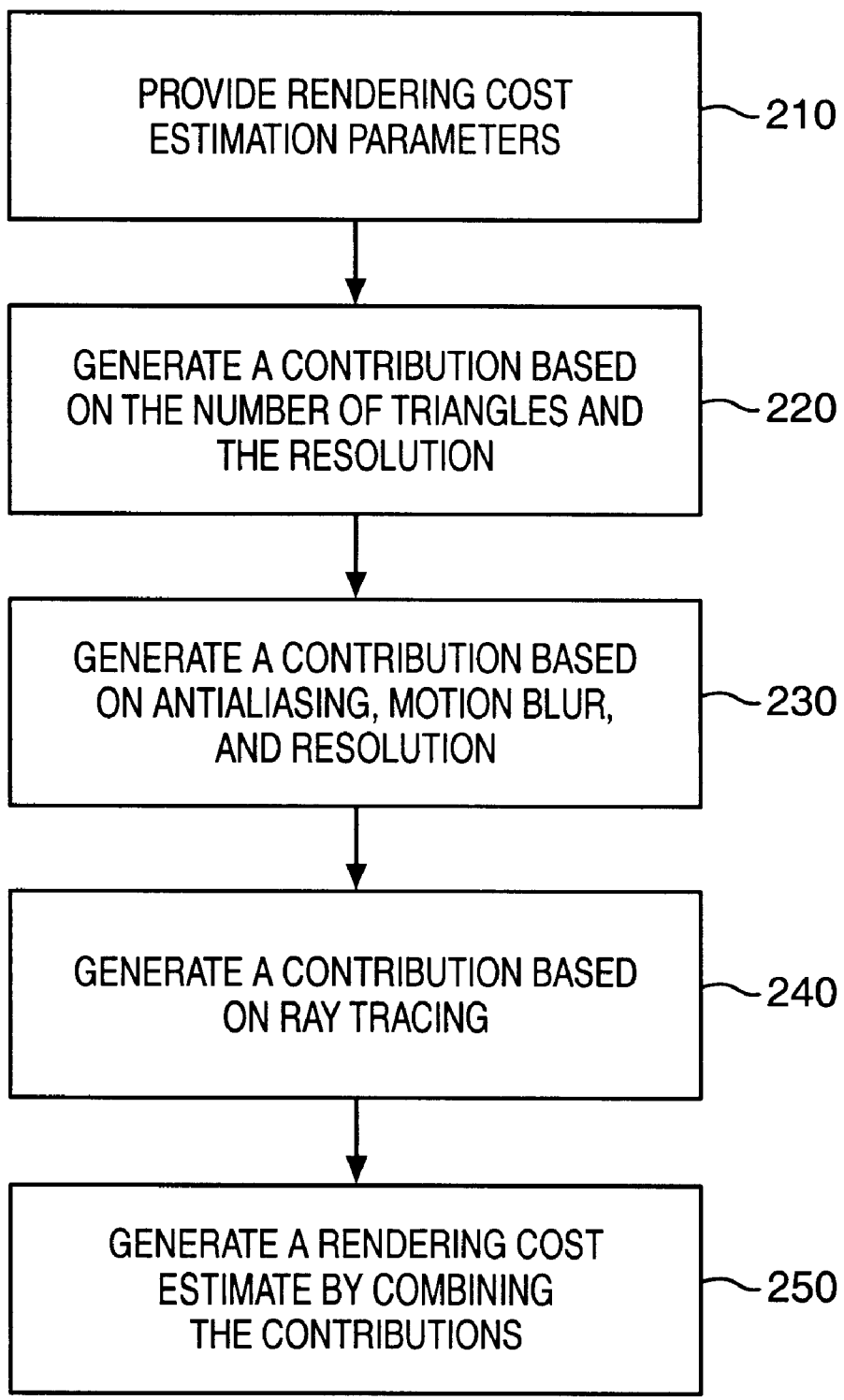
FIG. 2 is a flow diagram that shows a first exemplary method for generating a rendering cost estimate according to one embodiment of the present invention.

FIG. 2 shows a flow diagram of a method for generating a rendering cost estimate according to a first embodiment of the present invention. At block 210, a plurality of rendering cost estimation parameters associated with a computer-graphics model to be rendered are provided. According to this embodiment, parameters that represent resolution (i.e., number of pixels), number of triangles (i.e., millions of triangles), antialiasing (i.e., antialiasing setting and resolution), motion blur (i.e., motion-blur setting and resolution), and ray tracing (i.e., percent of scene ray traced and number of lights) are used to generate the rendering cost estimate in rendering time per image in seconds.

Figure 3:
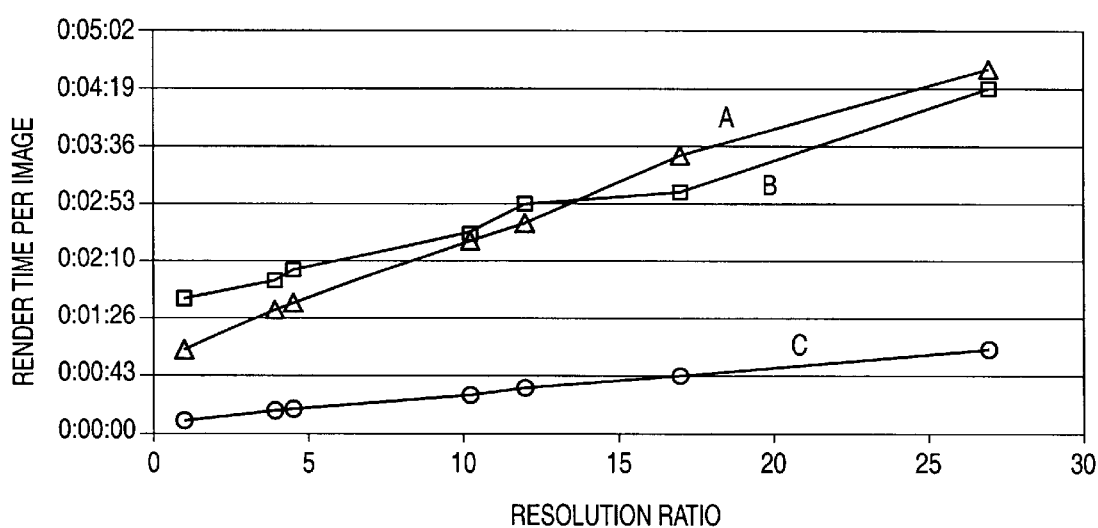
FIG. 3 shows an effect of resolution and number of triangles on the processing time to render an image.

At block 220, the parameters that represent resolution and number of triangles are used to generate a base-time contribution (BTC) to the rendering cost estimate. FIG. 3 shows the effect of resolution ratio (i.e., actual resolution normalized by 320×240 resolution) on the time to render three images with different numbers of triangles. The time to render increases substantially linearly with increasing resolution ratio. The different number of triangles in images A, B, and C are largely responsible for the differences in slopes and intercepts for these relationships. The number of triangles increases from A to B and B to C. Additional data indicates that, on average, both the slope and intercept increase with an increasing number of triangles.

Relating the rendering cost to resolution with a substantially linear relationship, and using separate substantially linear relationships to relate the slope and intercept of this relationship to the number of triangles can combine the effects of resolution and number of triangles. Mathematically, this takes the form: BTC=[(c1)(number of triangles)+c2][resolution]+[(c3)(number of triangles)+c4] Coefficients c1 and c2 may be determined by a best-fit linear regression of multiple slopes (from plots like FIG. 4a) versus number of triangles. Likewise, c3 and c4 may be determined by a best-fit linear regression of multiple intercepts (from plots like FIG. 4a) versus number of triangles. Preferably, c1–c4 are determined using actual rendering data collected for rendering jobs wherein the resolution and number of triangles changed significantly, but other parameters were nearly invariant and at their most typical values.

According to one embodiment, the computer-graphics model may be created using Maya and the rendering may be performed on one or more Pentium III 500 Mhz servers from Compaq. Based on actual such data, with resolution normalized by 320×240, and with rendering time per frame expressed in seconds, c1–c4 were determined as follows: c1=0.955, c2=1.41, c3=20.4, c4=−9.36. The invention is not limited to this embodiment, since analogous relationships may be developed for any graphics package and processing resources.

Figures 4A, 4B:
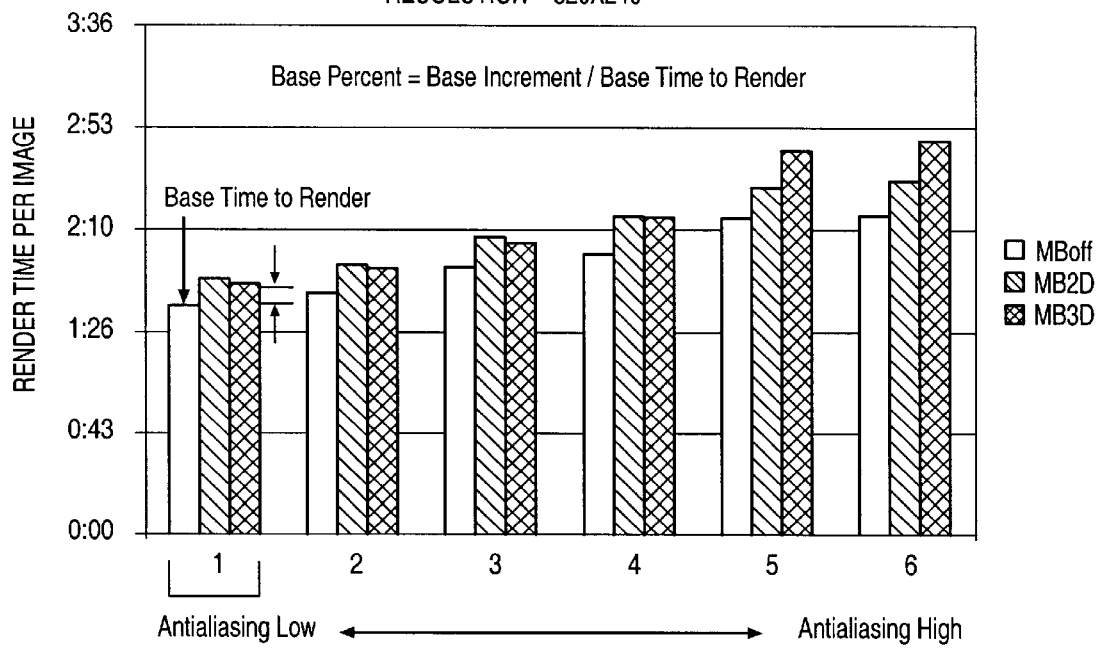
FIG. 4 shows an effect of antialiasing and motion blur on the processing time to render an image.

At block 230, the parameters that represent antialiasing and motion blur are used to generate an antialiasing, motion blur contribution (AAMBC) to the rendering cost estimate. Combining these cost factors may be advantageous, since one typically affects the other. FIG. 4a shows the affect of antialiasing and motion blur on the rendering time based on data compiled at 320×240 resolution. Six antialiasing settings are shown, ranging from low at the left to high at the right of the figure. Each antialiasing setting includes three motion blur settings: off (MBoff), two-dimensional motion blur (MB2D), and three-dimensional motion blur (MB3D). As shown in FIG. 4a, changing motion blur from MB2D to MB3D only affects the time to render at the highest antialiasing setting. FIG. 4a also shows a base render time per frame (at the lowest antialiasing setting and Mboff) and a base render time increase (time to render increase when antialiasing is at the lowest setting and motion blur is switched from Mboff to MB3D). FIG. 4b may be developed from FIG. 4a and used in generating the AAMBC. The numbers in FIG. 4b are calculated as follows: (render time per frame—base render time per frame)/(base render time increase). For example, at the highest antialiasing setting and MB2D, the value of 7 means that the actual rendering time per image is 7 multiplied by the base render time increase added to the base render time per frame.

Additional data at different resolutions indicate that the base fractional increase, calculated as base render time increase divided by base render time per frame, depends upon resolution. For example, at 320×240 resolution the base fractional increase may be 0.12, while at 1920×1080 resolution it may be 0.24. A simple linear relationship such as base fractional increase=(c5)(resolution)+c6, may be used. Based on data collected using Maya, dual Intel Pentium® III 500 Mhz processors from Compaq, resolution normalized by 320×240, and with rendering time per frame expressed in seconds, c5 and c6 were determined to be 0.0058 and 0.114, respectively. Generate AAMBC by forming a product of a value from FIG. 4b and the base fractional increase and adding one (i.e., 1) to the product.

At block 240, the parameters that represent ray tracing are used to generate a ray tracing contribution (RTC) to the rendering cost estimate. A ray tracing multiplier (RTM) is generated by the ratio, (rendering time with ray tracing)/(rendering time without ray tracing). Ray tracing typically depends on percent of image ray traced (%RT), number of lights, and resolution. Typical expected ranges for the ray tracing multiplier at low resolution (e.g., 320×240) and high resolution (e.g., 1920×1080) may be 7–10 at 50%RT and 9–15 at 100%RT. Resolution effects may be neglected as an approximation, such as using the RTM at a high resolution (e.g., 1920×1080), which is conservative. The nonlinear, slightly concave downward relationship for ray tracing may be expressed by, RTM=1+(c6)(% RT)(% RT)+(c7)(% RT). Based on data collected using Maya, Intel Pentium III 500 Mhz processors from Compaq, resolution at 1920×1080, and with rendering time per frame expressed in seconds, c6 and c7 were determined to be −0.001 and 0.21, respectively.

The discussion and data above are based on an image with three lights. A light correction may be used to adjust the RTM for different numbers of lights. The relationship, light correction=(c8)(number of lights)+1, is one relationship that may be used. Based on data collected using Maya and Intel Pentium III 500 Mhz processors from Compaq, c8 was determined to be (3.51). The RTC may then be generated by forming a product of RTM and the light correction.

At block 250, a rendering cost estimate, such as the time to render a scene, is generated by combining the base time contribution, the antialiasing, motion blur contribution, and the ray tracing contribution. In the present example, the BTC, the AAMBC, and the RTC are multiplied to generate the rendering cost estimate.

This method may be used to generate a rendering cost estimate for an exemplary single Maya image rendered on the Compaq processors. Consider an image with cost factors including a resolution ratio of 27 (i.e., 1920×1080), 3,000,000 triangles, a high antialiasing setting, 3D motion blur, 50% of the image ray traced, and with 3 lights. For this example the base time contribution becomes, BTC=[(0.955)(3)+1.41][27]+[(20.4)(3)−9.36]=167 seconds. From FIG. 4$b$ the table lookup value at high antialiasing and MB3D is 4. The correction for resolution is calculated as (0.0058)(27)+0.114=0.27. Then, AAMBC=1+(0.27)(4)=2.08. This means that the AAMBC approximately doubles the base time to render. The ray tracing contribution may be calculated as, RTC=−(0.001)(50)(50)+(0.21)(50)+1=9. The RTC does not need to be adjusted for lights, since the relationship was developed using 3 lights. Then the rendering cost estimate may be generated by, time to render per image= BTC*AAMBC*RTC. Accordingly, the total time to render the exemplary image is (167 seconds)(2.08)(9)=3126 seconds. To determine the time to render a video sequence, the process discussed above can be repeated for each image.

Second Exemplary Rendering Cost Estimation Method

Figure 5:
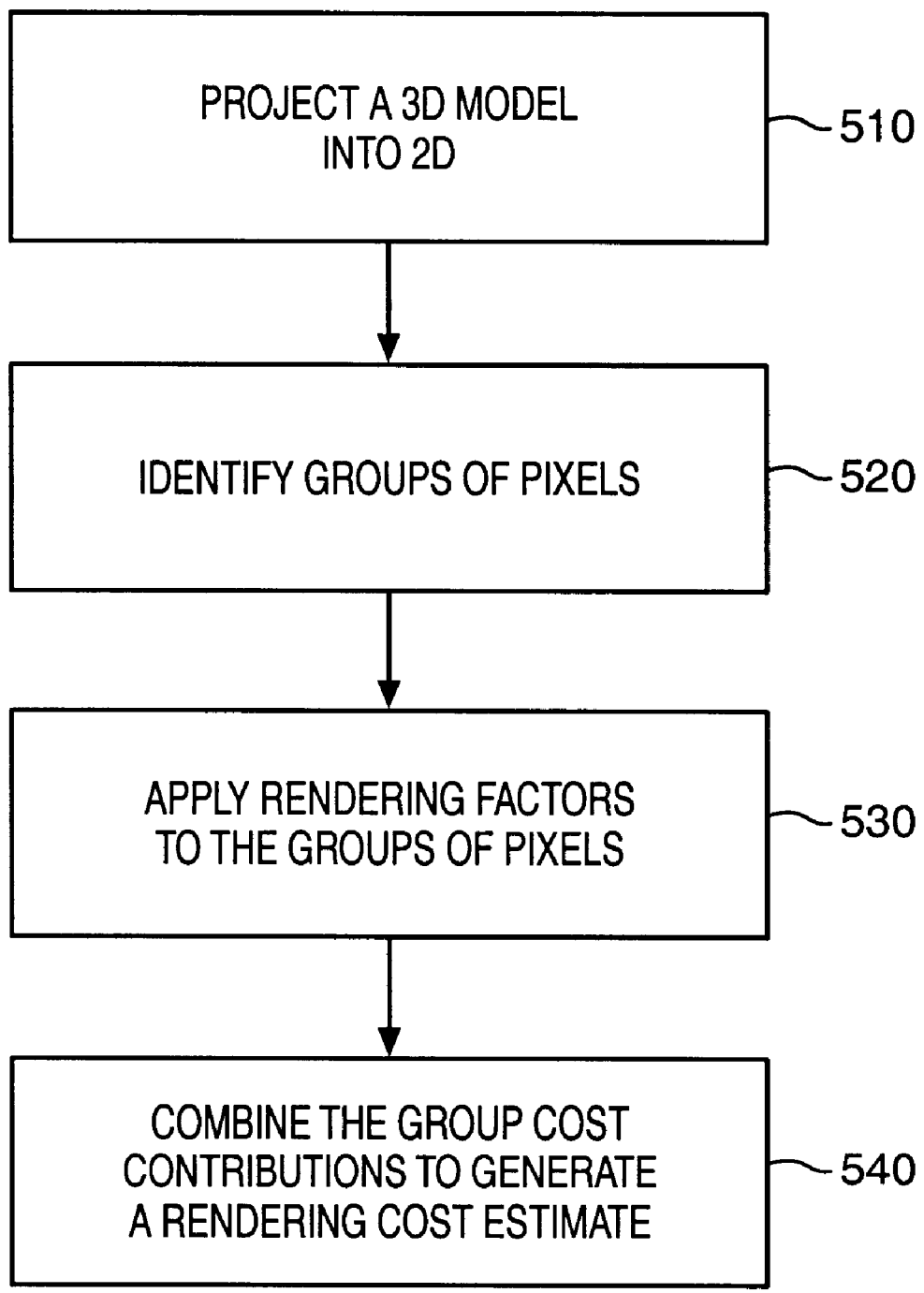
FIG. 5 is a flow diagram that shows a second exemplary method for generating a rendering cost estimate according to one embodiment of the present invention.

FIG. 5 shows a flow diagram of a method for generating a rendering cost estimate according to a second embodiment of the present invention. This method considers rendering at a higher level and may be more applicable to a wide range of graphics packages. Broadly stated, this method attempts to determine which pixels from a 3D model will be displayed in a 2D image generated from the 3D model and to account for contributing rendering costs associated with those pixels because those pixels are affected by one or more rendering factors (e.g., motion blur and others).

Typically, the method will use appropriate approximations so that resource costs to perform the estimation are significantly less than actual rendering costs that would be incurred.

At block 510, a 3D model is projected into 2D using less than full-rendering calculations and resources. In one embodiment, the projecting is done without applying rendering factors such as textures, ray tracing, antialiasing and others. Advantageously, this will allow the field of view or view volume of the 3D model to be determined with relatively few computations. By way of example, if a camera is situated directly along a longitudinal axis of a pipe in the 3D model, for a given scene, the projection will be an annulus corresponding to the thickness of the pipe. Advantageously, this determination allows the rendering cost estimation method to neglect all cost contributions due to the walls of the pipe, since they will not appear in the rendered image.

At block 520, groups of pixels are identified. In one embodiment, groups of pixels that are rendered differently, such as those to which a texture is mapped, or those to which motion blur is applied, are determined. The resolution may be used in this determination in one embodiment. In one embodiment, only an approximate number of pixels need to be determined. Bounding boxes, such as best-fit bounding boxes, may be used in this approximation. For example, a best-fit bounding box around the outside of the pipe may be used to represent the annulus of the pipe. This approach can be extended further to use an interior bounding box to remove the pipe's hole. Alternatively, the annulus of the pipe itself may be used.

At block 530, zero or more rendering factors are applied to the groups of pixels to generate group cost contributions. In one embodiment, a plurality of rendering factors are applied to the groups of pixels based on whether or not that rendering factor is used for that group of pixels in the 3D model. In one embodiment, rendering factors are applied to their groups as perimeter costs, area costs, or fixed costs. The perimeter cost applies to pixels forming perimeters that are affected by rendering factors that affect perimeters, such as antialiasing. The area costs are applied to groups of pixels forming areas that are affected by rendering factors that affect areas, such as texture mapping. Other rendering factors that may be represented by areas include shading due to lights, shadows, motion blur, environmental effects, ray tracing, and others. Fixed costs may also be used, such as for environmental effects and the background.

Relationships may be used to associate the rendering factors and the groups of pixels. A value for each rendering factor may be appropriate in many instances. For example, antialiasing is given a single value of rendering cost per unit perimeter. Of course, as mentioned above, antialiasing has multiple settings, so different relationships could be used to incorporate the varying effects that antialiasing may have.

At block 540, the group-cost contributions are combined to generate a rendering cost estimate. Typically, the group-cost contributions are summed together.

This method may be used to generate a rendering cost estimate for an exemplary image. Consider rendering a single image from a 3D model including a single, stationary, tilted cube against a background, with a camera centered directly in front of one face of the cube, to which a texture is applied. Projecting the cube into 2D gives a tilted square of 100×100 pixels. A cost for the background may be generated based on the area of pixels affected by the background and a cost per pixel coefficient of, for example, 0.000001 sec/pixel, as (0.000001)(1920×1080−100×100)= 2.06 sec. Likewise, a cost for texturing the face of the cube may be generated based on the area of the face of the cube and a cost per pixel coefficient of, for example, 0.0001 sec/pixel, as (0.0001)(100×100)=1 sec. A cost for antialiasing applied to the edges of the tilted square may be generated based on the perimeter of the square and a cost per pixel in the perimeter coefficient of, for example, 0.005 sec/pixel, as (0.005)(4)(100)=2 sec. Then the rendering cost estimate may be generated by combining the contributions yielding 2.06+ 1+2=5.06 seconds to render image. Accordingly, the total time to render the exemplary image is 5.06 seconds. To determine the time to render a video sequence, the process discussed above can be repeated for each image. The image and cost factors in this example were provided to illustrate the principles of the invention. Other images and coefficients and methods of varying complexity are also contemplated. The coefficients provided are examples of coefficients that may be appropriate for a particular graphics rendering application running on a particular computer. The coefficients can be determined after analyzing statistical data collected based on prior rendering using the same graphics rendering application and computer system.

Exemplary Computer Architecture

As discussed herein, a "system", such as the system for generating a rendering cost estimate, may be an apparatus including hardware and/or software for processing data. The system may include, but is not limited to, a computer (e.g., portable, laptop, desktop, server, mainframe, etc.), hard copy equipment (e.g., film recorder, optical disk burner, printer, plotter, fax machine, etc.), and the like.

Figure 6:
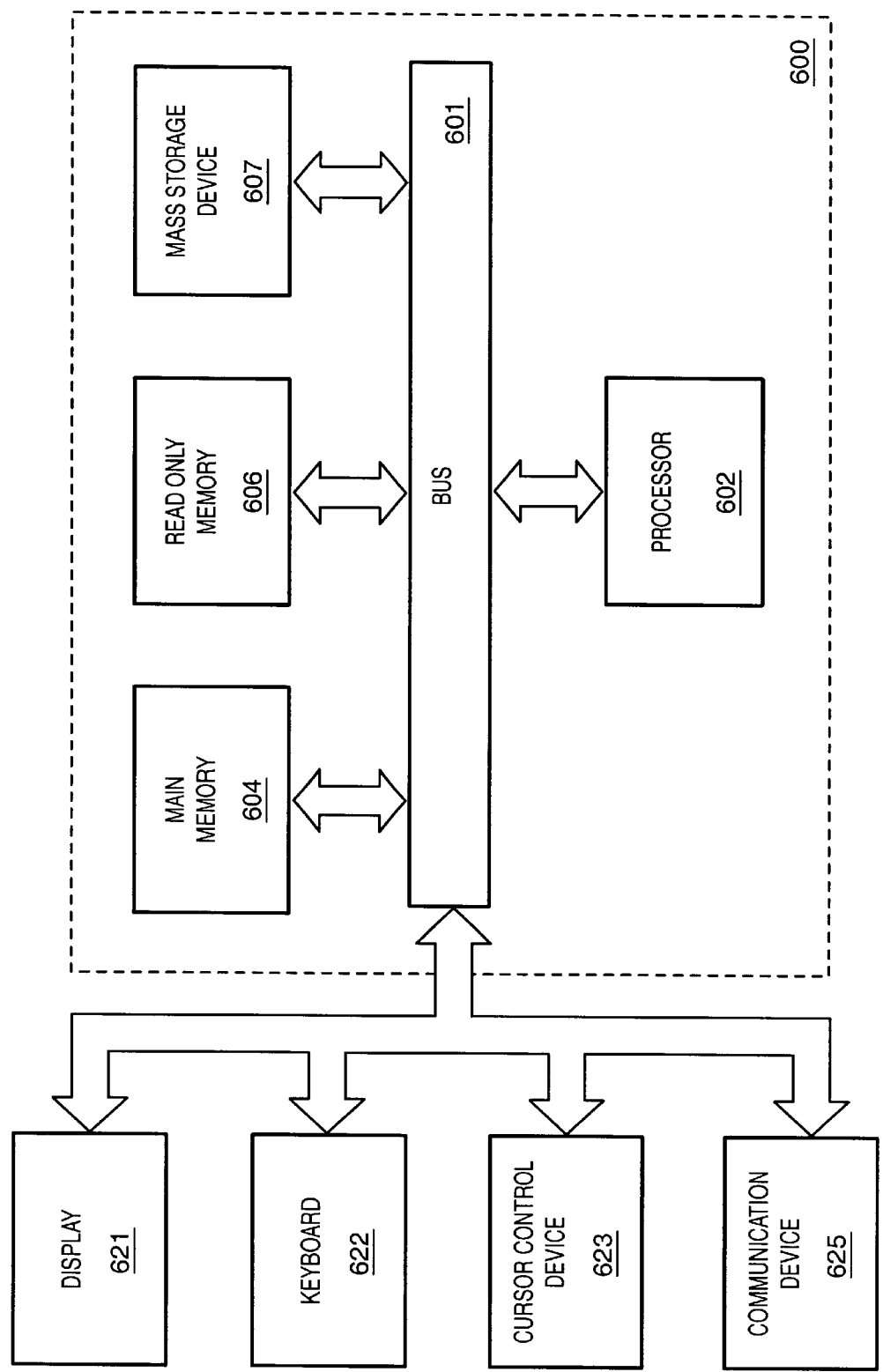
FIG. 6 is a block diagram of a computer system upon which one embodiment of the present invention may be implemented.

A computer system 600 representing an exemplary workstation, host, or server in which features of the present invention may be implemented will now be described with reference to FIG. 6. The computer system 600 represents one possible computer system for implementing embodiments of the present invention, however other computer systems and variations of the computer system 600 are also possible. The computer system 600 comprises a bus or other communication means 601 for communicating information, and a processing means such as processor 602 coupled with the bus 601 for processing information. The computer system 600 further comprises a random access memory (RAM) or other dynamic storage device 604 (referred to as main memory), coupled to the bus 601 for storing information and instructions to be executed by the processor 602. The main memory 604 also may be used for storing temporary variables or other intermediate information during execution of instructions by the processor 602. In one embodiment, the main memory 604 may be used for storing one or more of graphics instructions, rendering instructions, rendering cost estimation instructions, rendering, and rendering cost estimation data. The computer system 600 also comprises a read only memory (ROM) and other static storage devices 606 coupled to the bus 601 for storing static information and instructions for the processor 602. A data storage device 607 such as a magnetic disk, zip, or optical disc and its corresponding drive may also be coupled to the computer system 600 for storing information and instructions. In one embodiment, the data storage device 607 may allow images to be output to film, magnetic, optical, or other media.

The computer system 600 may also be coupled via the bus 601 to a display device 621, such as a cathode ray tube (CRT) or Liquid Crystal Display (LCD), for displaying information to an end user. Typically, an alphanumeric input device 622, such as a keyboard including alphanumeric and other keys, may be coupled to the bus 601 for communicating information and command selections to the processor 602. Another type of user input device is a cursor control device 623, such as a mouse, a trackball, or cursor direction keys for communicating direction information and command selections to the processor 602 and for controlling cursor movement on the display 621.

A communication device 625 is also coupled to the bus 601. Depending upon the particular implementation, the communication device 625 may include a modem, a network interface card, or other well-known interface devices, such as those used for coupling to Ethernet, token ring, or other types of physical attachment for purposes of providing a communication link to support a local or wide area network, for example. In any event, in this manner, the computer system 600 may be coupled to a number of clients or servers via a conventional network infrastructure, such as a company's Intranet or the Internet, for example.

The invention is not limited to any particular computer system. Rather, embodiments may be used on any stand alone, distributed, networked, or other type of computer system. For example, embodiments may be used on one or more computers compatible with NT, Linux, Windows, Macintosh, any variation of Unix, or others.

The present invention includes various steps, as described above. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

In conclusion, the present invention provides a system and method for generating a rendering cost estimate that is sufficiently close to an actual rendering cost that would be incurred if computer-generated images were actually rendered.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

receiving a three-dimensional computer graphics model associated with a movie;

generating a rendering cost estimate by deriving rendering cost estimate information from the model and combining the information with a rendering cost estimation relationship;

wherein said generating comprises generating the rendering cost estimate based on a resolution, a number of triangles, an antialiasing setting, a motion blur setting, a ray tracing setting, a percent of a scene to be ray traced, and a number of lights derived from the model, including:

generating a first contribution to the rendering cost estimate by combining the resolution and the number of triangles with a first rendering cost estimation relationship portion;

generating a second contribution to the rendering cost estimate by combining the antialiasing setting, the motion blur setting, and the resolution with a second rendering cost estimation relationship portion;

generating a third contribution to the rendering cost estimate by combining the ray tracing setting, the percent of a scene to be ray traced, and the number of lights with a third rendering cost estimation relationship portion; and generating the rendering cost estimate by combining the first, the second, and the third contributions to the rendering cost estimate; and providing the rendering cost estimate to a movie studio prior to rendering the model.

2. The method of claim 1:
further comprising receiving a rendering completion time specified by the movie studio; and
wherein said generating comprises generating the rendering cost estimate based on the specified rendering completion time.

3. The method of claim 1, further comprising using a server farm to render the three-dimensional computer graphics model after receiving an indication that the movie studio finds the provided rendering cost estimate acceptable.

4. A method comprising:
receiving a three-dimensional computer graphics model associated with a movie;
generating a rendering cost estimate by deriving rendering cost estimate information from the model and combining the information with a rendering cost estimation relationship, including:
generating an antialiasing cost contribution by multiplying a line length affected by antialiasing by an antialiasing cost per unit length; and
generating a ray tracing cost contribution by multiplying an area affected by ray tracing by a ray tracing cost per unit area; and
providing the rendering cost estimate to a movie studio prior to rendering the model.

5. The method of claim 4:
further comprising receiving a rendering completion time specified by the movie studio; and
wherein said generating comprises generating the rendering cost estimate based on the specified rendering completion time.

6. The method of claim 4, further comprising using a server farm to render the three-dimensional computer graphics model after receiving an indication that the movie studio finds the provided rendering cost estimate acceptable.

7. A method comprising:
receiving a computer-graphics model from a computer-graphics model creator;
deriving rendering cost estimate information from the computer-graphics model;
further comprising receiving a price to be charged for the rendering that is specified by the computer-graphics model creator;
generating a rendering cost estimate by using the derived information;
wherein said generating comprises generating the rendering cost estimate based on the specified price; and
providing the rendering cost estimate to the computer-graphics model creator prior to the rendering of the model.

8. The method of claim 7, wherein said receiving the computer graphics model comprises receiving a three-dimensional computer-graphics model stored on a computer-readable medium from a computer-graphics model creator that is selected from the group consisting of a motion picture studio and a television studio.

9. The method of claim 7:
further comprising receiving a rendering completion time specified by the computer-graphics model creator; and
wherein said generating comprises generating the rendering cost estimate based on the specified rendering completion time.

10. The method of claim 7, further comprising using a server farm to render the three-dimensional computer graphics model after receiving an indication that the computer-graphics model creator finds the provided rendering cost estimate acceptable.

11. A method comprising:
receiving a computer-graphics model from a computer-graphics model creator;
deriving rendering cost estimate information from the computer-graphics model;
generating a rendering cost estimate by using the derived information;
wherein said generating comprises generating the rendering cost estimate based on a resolution, a number of triangles, an antialiasing setting, a motion blur setting, a ray tracing setting, a percent of a scene to be ray traced, and a number of lights derived from the model, including:
generating a first contribution to the rendering cost estimate by combining the resolution and the number of triangles with a first rendering cost estimation relationship portion;
generating a second contribution to the rendering cost estimate by combining the antialiasing setting, the motion blur setting, and the resolution with a second rendering cost estimation relationship portion;
generating a third contribution to the rendering cost estimate by combining the ray tracing setting, the percent of a scene to be ray traced, and the number of lights with a third rendering cost estimation relationship portion; and
generating the rendering cost estimate by combining the first, the second, and the third contributions to the rendering cost estimate; and
providing the rendering cost estimate to the computer-graphics model creator prior to rendering the model.

12. The method of claim 11, wherein said receiving comprises receiving a three-dimensional computer-graphics model stored on a computer-readable medium from a computer-graphics model creator that is selected from the group consisting of a motion picture studio and a television studio.

13. The method of claim 11:
further comprising receiving a rendering completion time specified by the computer-graphics model creator; and
wherein said generating comprises generating the rendering cost estimate based on the specified rendering completion time.

14. The method of claim 11, further comprising using a server farm to render the three-dimensional computer graphics model after receiving an indication that the computer-graphics model creator finds the provided rendering cost estimate acceptable.

15. A method comprising:
receiving a computer-graphics model from a computer-graphics model creator;
deriving rendering cost estimate information from the computer-graphics model;
generating a rendering cost estimate by using the derived information, including:
generating an antialiasing cost contribution by multiplying a line length affected by antialiasing by an antialiasing cost per unit length; and
generating a ray tracing cost contribution by multiplying an area affected by ray tracing by a ray tracing cost per unit area; and
providing the rendering cost estimate to the computer-graphics model creator prior to rendering the model.

16. The method of claim 15, wherein said receiving comprises receiving a three-dimensional computer-graphics model stored on a computer-readable medium from a computer-graphics model creator that is selected from the group consisting of a motion picture studio and a television studio.

17. The method of claim 15:

further comprising receiving a rendering completion time specified by the computer-graphics model creator; and wherein said generating comprises generating the rendering cost estimate based on the specified rendering completion time.

18. The method of claim 15, further comprising using a server farm to render the three-dimensional computer graphics model after receiving an indication that the computer-graphics model creator finds the provided rendering cost estimate acceptable.

19. A method comprising:

receiving a computer-graphics model from a computer-graphics model creator;

deriving rendering cost estimate information from the computer-graphics model;

generating a rendering cost estimate by using the derived information, including:

combining a number of primitives with a first linear relationship;

combining a resolution with a second linear relationship; and combining a number of lights with a third linear relationship; and providing the rendering cost estimate to the computer-graphics model creator prior to rendering the model.

20. The method of claim 19, wherein said receiving comprises receiving a three-dimensional computer-graphics model stored on a computer-readable medium from a computer-graphics model creator that is selected from the group consisting of a motion picture studio and a television studio.

21. The method of claim 19:

further comprising receiving a rendering completion time specified by the computer-graphics model creator; and wherein said generating comprises generating the rendering cost estimate based on the specified rendering completion time.

22. The method of claim 19, further comprising using a server farm to render the three-dimensional computer graphics model after receiving an indication that the computer-graphics model creator finds the provided rendering cost estimate acceptable.

23. A machine-readable medium having stored thereon data representing sequences of instructions for generating a rendering cost estimate that if executed cause a machine to perform operations comprising:

deriving rendering cost estimate information from a three-dimensional computer-graphics model received from a studio; and generating a rendering cost estimate by using the derived information prior to rendering the model, including:

generating an antialiasing cost contribution by multiplying a line length affected by antialiasing by an antialiasing cost per unit length; and generating a ray tracing cost contribution by multiplying an area affected by ray tracing by a ray tracing cost per unit area.

24. The machine-readable medium of claim 23, wherein the instructions for generating the rendering cost estimate further include instructions that if executed cause the machine to perform operations comprising:

generating the rendering cost estimate based on a resolution, a number of triangles, an antialiasing setting, a motion blur setting, a ray tracing setting, a percent of a scene to be ray traced, and a number of lights derived from the model.

* * * * *

UNITED STATES PATENT AND TRADEMARK OFFICE
CERTIFICATE OF CORRECTION

| | | |
|---|---|---|
| PATENT NO. | : 6,618,046 B1 | Page 1 of 1 |
| APPLICATION NO. | : 09/675610 | |
| DATED | : September 9, 2003 | |
| INVENTOR(S) | : Ganapati N. Srinivasa et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 251 days.

Signed and Sealed this

Eighth Day of March, 2011

David J. Kappos
*Director of the United States Patent and Trademark Office*